US012252063B2

(12) United States Patent
Kirchmair et al.

(10) Patent No.: US 12,252,063 B2
(45) Date of Patent: Mar. 18, 2025

(54) CRAWLER VEHICLE FOR SKI RUNS AND METHOD OF DISPLAYING INFORMATION FOR SUCH A SNOW CRAWLER VEHICLE

(71) Applicant: PRINOTH S.P.A., Vipiteno (IT)

(72) Inventors: Martin Kirchmair, Vipiteno (IT);
Andreas Muigg, Vipiteno (IT);
Richard Casartelli, Vipiteno (IT);
Alberto Paoletti, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 831 days.

(21) Appl. No.: 17/294,961

(22) PCT Filed: Nov. 21, 2019

(86) PCT No.: PCT/IB2019/060043
§ 371 (c)(1),
(2) Date: May 18, 2021

(87) PCT Pub. No.: WO2020/104997
PCT Pub. Date: May 28, 2020

(65) Prior Publication Data
US 2022/0017163 A1 Jan. 20, 2022

(30) Foreign Application Priority Data
Nov. 21, 2018 (IT) .................. 102018000010490

(51) Int. Cl.
*B60Q 1/08* (2006.01)
*B60Q 1/24* (2006.01)
(Continued)

(52) U.S. Cl.
CPC .............. *B60Q 1/085* (2013.01); *B60Q 1/24* (2013.01); *B60Q 1/545* (2022.05); *E01H 4/02* (2013.01);
(Continued)

(58) Field of Classification Search
CPC ...... B60Q 2400/50; B60Q 1/24; B60Q 1/085; B60Q 1/545; B60Q 2300/32;
(Continued)

(56) References Cited

U.S. PATENT DOCUMENTS 6,295,007 B1 * 9/2001 O'Meara .............. G08G 5/0026
340/953
2002/0116122 A1 * 8/2002 Satonaka .................. F25C 3/04
342/357.57
(Continued)

FOREIGN PATENT DOCUMENTS

CN  104787046 A  7/2015
DE  8515108 U1  7/1985
(Continued)

OTHER PUBLICATIONS

Office Action and Search Report for Chinese Application No. 201911140623.8 dated Nov. 14, 2022 (21 pages).
(Continued)

*Primary Examiner* — Thomas Ingram
*Assistant Examiner* — Faris Asim Shaikh
(74) *Attorney, Agent, or Firm* — Neal, Gerber & Eisenberg, LLP

(57) ABSTRACT

A crawler vehicle for ski runs has a frame; a cab; two tracks; a user interface located in the cab; a plurality of sensors configured to acquire signals correlated to the operation of the crawler vehicle, to the weather and/or snow conditions, and to the position of the crawler vehicle in relation to reference points and/or possible obstacles; a control unit for processing said signals and providing additional signals; and at least one projector for projecting on surfaces outside the cab, in particular on the ski run, at least one contoured beam as a function of at least one of the additional signals to
(Continued)

provide one piece of information to the driver and/or human beings in the vicinity of the crawler vehicle.

22 Claims, 2 Drawing Sheets

(51) Int. Cl.
*B60Q 1/50* (2006.01)
*E01H 4/02* (2006.01)
(52) U.S. Cl.
CPC ...... *B60Q 2300/32* (2013.01); *B60Q 2300/45* (2013.01); *B60Q 2400/50* (2013.01); *B60R 2300/20* (2013.01)
(58) Field of Classification Search
CPC .. B60Q 2300/45; B60Q 2800/20; E01H 4/02; B62D 55/06; B60R 2300/20; B60R 1/00
See application file for complete search history.

(56) References Cited

U.S. PATENT DOCUMENTS

| | | | | |
|---|---|---|---|---|
| 2003/0147247 | A1* | 8/2003 | Koike | B60Q 1/484 362/464 |
| 2004/0189447 | A1* | 9/2004 | Okubo | B60Q 1/10 340/425.5 |
| 2004/0218401 | A1* | 11/2004 | Okubo | B60Q 1/143 362/276 |
| 2006/0235597 | A1* | 10/2006 | Hori | G08G 1/096758 701/96 |
| 2006/0247067 | A1* | 11/2006 | Biner | A63C 19/10 472/85 |
| 2008/0204280 | A1* | 8/2008 | Reason | G08G 5/0026 340/955 |
| 2010/0017111 | A1* | 1/2010 | Stefani | G01C 21/365 353/121 |
| 2010/0131197 | A1* | 5/2010 | Zhang | G01C 21/36 382/104 |
| 2012/0194356 | A1* | 8/2012 | Haines | G08G 1/161 340/933 |
| 2012/0298887 | A1* | 11/2012 | Stevens | G01B 11/2513 250/492.1 |
| 2015/0298598 | A1* | 10/2015 | Nüssli | H04N 9/3147 345/2.2 |
| 2016/0031366 | A1* | 2/2016 | White | B60Q 1/2661 353/121 |
| 2016/0090038 | A1* | 3/2016 | Briggs | B60Q 1/525 340/435 |
| 2017/0343374 | A1* | 11/2017 | Yi | G06V 20/588 |
| 2018/0093607 | A1* | 4/2018 | Omanovic | B60Q 1/34 |
| 2018/0118099 | A1* | 5/2018 | Kunii | H04N 9/3179 |
| 2019/0003136 | A1* | 1/2019 | Kimura | E01H 5/098 |
| 2019/0164344 | A1* | 5/2019 | Potter | B60Q 1/507 |
| 2019/0329708 | A1* | 10/2019 | Hakki | B60Q 9/008 |
| 2020/0047807 | A1* | 2/2020 | Kim | B62D 15/0295 |
| 2020/0109532 | A1* | 4/2020 | Betz | E01H 4/02 |
| 2021/0001724 | A1* | 1/2021 | Dobashi | B60Q 1/18 |
| 2021/0053483 | A1* | 2/2021 | Takeyasu | G06T 7/70 |
| 2021/0072020 | A1* | 3/2021 | Thöny | G06V 20/58 |
| 2023/0311740 | A1* | 10/2023 | Kunii | B60Q 1/38 362/538 |

FOREIGN PATENT DOCUMENTS

| | | |
|---|---|---|
| DE | 102011119923 A1 | 5/2013 |
| DE | 102017203528 A1 | 9/2018 |
| EP | 1331198 A1 | 7/2003 |
| EP | 2071281 A1 | 6/2009 |
| EP | 2158799 A1 | 3/2010 |
| EP | 2354316 A1 | 8/2011 |
| EP | 3363684 A1 | 8/2018 |
| RU | 2702375 C2 | 10/2019 |
| WO | WO 2018038654 A1 | 3/2018 |
| WO | WO 2019121880 A1 | 6/2019 |

OTHER PUBLICATIONS

Notification Concerning Submission, Obtention or Transmittal of Priority Document for International Application No. PCT/IB2019/060043 dated Feb. 25, 2020.
International Search Report and Written Opinion for International Application No. PCT/IB2019/060043 dated Jan. 8, 2020.
Office Action and Search Report for Russian Application No. 2021117720/11 dated Dec. 29, 2022 with translation (13 pages).

* cited by examiner

CRAWLER VEHICLE FOR SKI RUNS AND METHOD OF DISPLAYING INFORMATION FOR SUCH A SNOW CRAWLER VEHICLE

PRIORITY CLAIM

This application is a national stage application of PCT/IB2019/060043, filed on Nov. 21, 2019, which claims the benefit of and priority to Italian Patent Application No. 102018000010490, filed on Nov. 21, 2018, the entire contents of which are each incorporated by reference herein.

TECHNICAL FIELD

The present disclosure concerns a crawler vehicle for ski runs. In particular, the present disclosure relates to a crawler vehicle for the transport of people along the ski runs and/or the preparation of ski runs.

BACKGROUND

Certain crawler vehicles for ski runs are characterized in that they acquire a plurality of signals correlated to the crawler vehicle's operation data and possibly, if present, of the crawler vehicle's equipment for the preparation of ski runs such as, for example, the cutter, the shovel, and the winch.

Certain ski run crawler vehicles are often configured to acquire signals correlated to: weather conditions, such as temperature and humidity; snow conditions, such as temperature and thickness of the snowpack; obstacles along the run; and reference points. The signals acquired are processed to provide additional signals in order to transmit as much information as possible to ensure the safety and, where appropriate, the relative quality of the ski runs' preparation.

While the large amount of information available improves the safety conditions and quality of the ski runs, this information is displayed on one or more screens inside the cab and, as a result, the driver of the crawler vehicle takes their eyes off the track and gives up visual driving for a period of time.

SUMMARY

The present disclosure provides a crawler vehicle for ski runs that reduces certain of the drawbacks of certain of the prior art. Specifically, in accordance with one embodiment of the present disclosure, a crawler vehicle for ski runs is provided, wherein the crawler vehicle comprises a frame; a cab; two tracks; a user interface located in the cab; at least one sensor configured to acquire at least one signal between signals correlated to the operation of the crawler vehicle, signals correlated to weather and/or snow conditions, and signals correlated to the position of the crawler vehicle in relation to reference points and/or possible obstacles; a control unit configured to process the signal and provide at least one additional signal; and at least one projector of contoured beams and/or images configured to project at least one contoured beam and/or one image, as a function of the additional signal, on surfaces outside the cab (in particular, on the ski run) in order to provide at least one piece of information to the driver and/or to human beings in the vicinity of the crawler vehicle. Such a configuration provides that the driver of the crawler vehicle is able to receive information without taking their eyes off the ski run.

In addition, some information may be directed to other human beings present on the ski run such as, fur example, skiers who need to be warned of any dangerous situations or drivers of other crawler vehicles that are nearby.

In particular, the user interface comprises a selector for selecting one or more pieces of information to be projected outside the cab from the information correlated to: the operation of the crawler vehicle, weather and/or snow conditions, and the position of the crawler vehicle in relation to reference points and/or possible obstacles. In this way, the driver can select which and how much information to project outside the cab as a function of the weather conditions, brightness, visibility, and possibly relatively dangerous situations.

The same information is replicated on a user interface screen.

In particular, the projector is selected from a Laser beamer; an LED beamer; a Laser/LED beamer; and a halogen beamer to produce high resolution images.

In particular, said sensors comprise: a GPS receiver for acquiring signals correlated to the geolocation and/or navigation of the crawler vehicle; said control unit being configured to process additional signals correlated to the position of the crawler vehicle in relation to ski run reference points; said projector being configured to project contoured beams that illuminate said reference points in the vicinity of the crawler vehicle. In this way, visual driving is facilitated by precisely indicating reference points with the benefit of increasing navigational safety.

In particular, said reference points comprise the edges of the ski run. In this way, the driver has a relatively greater perception of the boundaries of the ski run.

In accordance with one embodiment of the present disclosure, said reference points comprise a dividing line between a machined portion and an unmachined portion of the ski run. In this way, the driver can avoid re-machining a previously machined part of the run or not machining a part of the run that has not yet been machined.

In particular, at least one of the sensors provides at least one signal correlated to weather and/or snow conditions, and the control unit is configured to provide additional signals correlated to information on snow conditions on the ski run according to at least one signal correlated to weather and/or snow conditions. Said projector is configured to project contoured beams or images on the ski run that define information on snow conditions in graphic or alphanumeric form.

The information on snow conditions such as, for example, depth, temperature, etc., can be used to adjust the cutter parameters. In accordance with the present disclosure, the driver of the crawler vehicle is able to obtain this information without consulting the screen in the cab.

In particular, at least one of the sensors provides at least one signal correlated to the position of the crawler vehicle in relation to reference points and/or possible obstacles, and said control unit is configured to provide additional signals correlated to the position of said obstacles in relation to the crawler vehicle according to at least one signal correlated to the position of the crawler vehicle in relation to reference points and/or possible obstacles. Said projector is configured to project light beams that illuminate said obstacles in the vicinity of the crawler vehicle. The relative simple illumination of the obstacles means they are relatively easier to identify along the run.

In particular, at least one of the sensors provides at least one signal correlated to the operation of the crawler vehicle, and said control unit is configured to provide additional signals correlated to the information on the crawler vehicle's operation data according to at least one signal correlated to the operation of the crawler vehicle. Said projector is configured to project light beams that define the information in graphic or alphanumeric form onto the ski run. This solution facilitates the visual driving of the crawler vehicle.

The present disclosure also provides a method for displaying information for a crawler vehicle for ski runs that overcomes certain of the drawbacks of certain of the prior art. Specifically, according to the present disclosure, a method for displaying information for a crawler vehicle for ski runs is provided, wherein the method comprises: acquiring at least one of the signals correlated to the operation of the crawler vehicle, signals correlated to the weather and/or snow conditions, and signals correlated to the position of the crawler vehicle in relation to reference points and/or possible obstacles; processing at least said signal and providing at least one additional signal for controlling at least one projector arranged onboard the crawler vehicle; and projecting at least one contoured beam and/or one image as a function of at least one additional signal on surfaces outside the cab (in particular, on the ski run) in order to provide at least one piece of information to the driver and/or human beings in the vicinity of the crawler vehicle.

BRIEF DESCRIPTION OF THE DRAWINGS

Further features and advantages of the present disclosure will be apparent from the following description of a non-limiting embodiment thereof, with reference to the figures, wherein.

DETAILED DESCRIPTION

Figure 1:
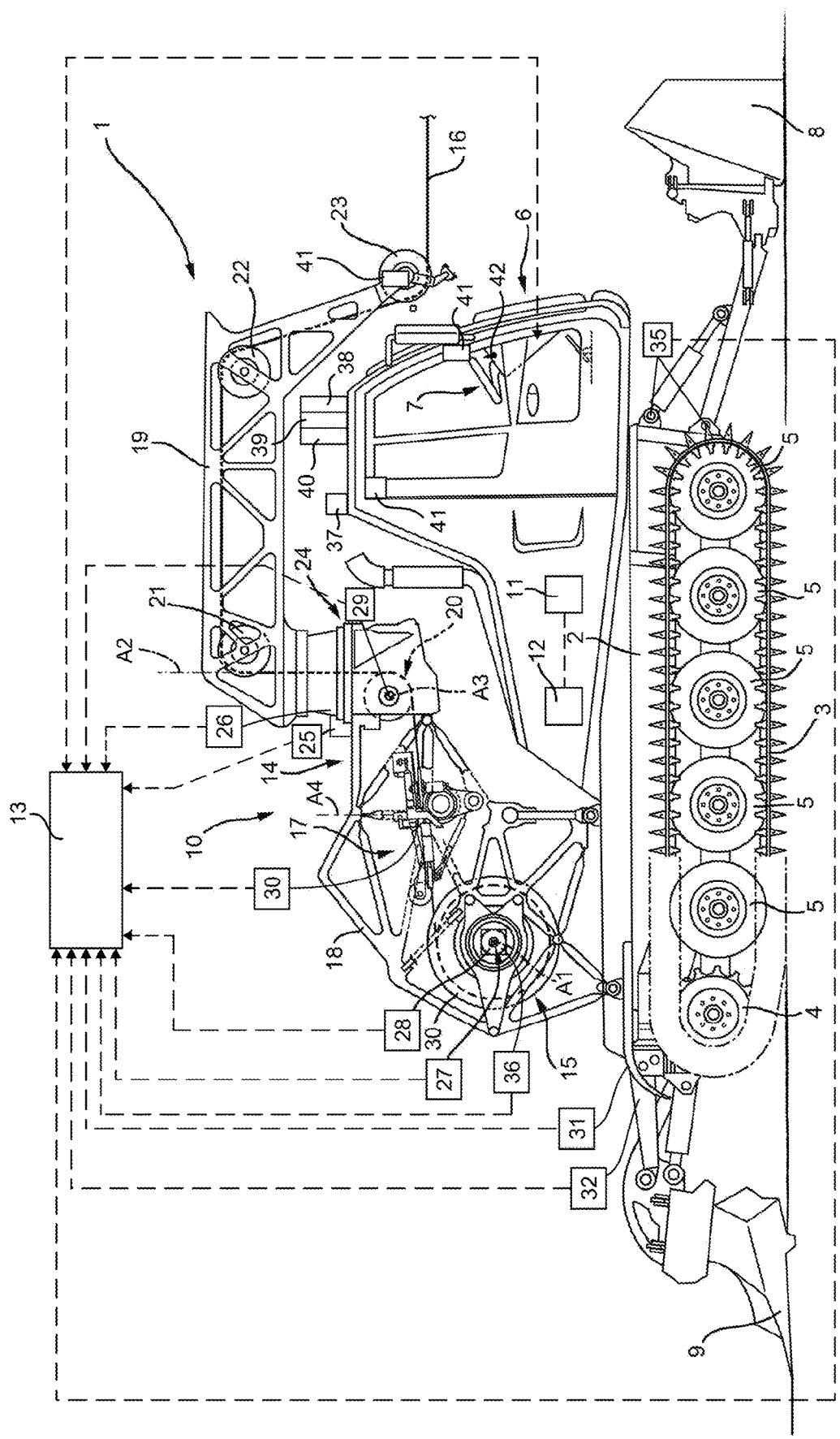
FIG. 1 is a lateral elevation view, with parts removed for clarity and integrated with a block diagram, of a crawler vehicle for ski runs constructed in accordance with the present disclosure.

With reference to FIG. 1, the reference number 1 indicates in its entirety a crawler vehicle for ski runs, which comprises a frame 2; two tracks 3 (only one is shown in FIG. 1); two drive wheels 4 (only one is shown in FIG. 1) operationally coupled to the respective tracks 3; idler wheels 5 supporting the tracks 3; a cab 6; and a user interface 7 arranged in the cab 6. In the present disclosure, the definition "crawler vehicle" for ski runs means both a crawler vehicle used for the transport of persons along the ski runs and a crawler vehicle comprising at least one piece of equipment for the preparation of ski runs and auxiliary piece of equipment.

In the case shown here, the crawler vehicle 1 comprises two pieces of equipment for the preparation of a ski run: a shovel 8 supported by the frame 2 at the front; and a cutter 9 supported by frame 2 at the back. The crawler vehicle 1 comprises an auxiliary piece of equipment, in this case a winch assembly 10 fixed above the frame 2 behind the cab 6 and configured to secure the crawler vehicle when the crawler vehicle drives up or down relatively very steep slopes.

The crawler vehicle 1 comprises an engine 11 and a power transmission 12, which is operationally connected to the engine 11, to the drive wheels 4, to the shovel 8, to the cutter 9, and to the winch assembly 10. The power transmission 12 can be hydraulic or electric or a hydraulic and electric combination.

The crawler vehicle 1 comprises a control unit 13 connected to the user interface 7 and configured to control the crawler vehicle 1, the shovel 8, the cutter 9, and the winch assembly 10.

The winch assembly 10 comprises a support structure 14 mounted on the frame 2; a sprocket wheel 15 supported by the support structure 14 in a swivelling manner around an axis A1; a cable 16 with one end fixed to the sprocket wheel 15 and partly wound around the sprocket wheel 15; a cable guide 17 configured to control the cable 16 as the cable is unwound from the sprocket wheel 15 and wound onto the sprocket wheel 15. In the case shown here, the support structure 14 comprises a base 18 attached to the frame 2 and an arm 19 mounted in a swivelling manner on the base 18 around an axis A2 and configured to direct the cable 16 to a cable 16 anchorage point, regardless of the orientation of the crawler vehicle 1 in relation to the anchorage point (not shown in the figures). The base 18 supports the sprocket wheel 15, an idler pulley 20, which can be swivelled around an axis A3 that is parallel to the axis A1 of the sprocket wheel 15, and the cable guide 17 that is arranged between the sprocket wheel 15 and the idler pulley 20 and has an arm that can be swung around an axis A4. The arm 19 comprises idler pulleys 21, 22 and 23.

The support structure 14 comprises a fifth wheel 24 placed between the base 18 and the arm 19; a motorized mechanism 25 operationally coupled to the fifth wheel 24 configured to selectively rotate the arm 19 around the axis A2 in relation to the base 18 by a motorized mechanism 25; and a sensor 26 configured to acquire the position of the arm 19 in relation to the base 18.

The winch group 1 also comprises an actuator group 27, which is operationally connected to the sprocket wheel 15 and is configured to rotate the sprocket wheel 15 around the axis A1 in opposite directions; and a sensor 28 that is coupled to the sprocket wheel 15 configured to detect the position of the sprocket wheel 15 around the axis A1. In this illustrated embodiment, the angular position of the sprocket wheel 15 enables the calculation of the amount of cable 16 wound on the sprocket wheel 15 and the amount of cable 16 unwound.

The crawler vehicle 1 comprises additional sensors: an angular sensor 29 configured to detect the angular position of the pulley 20; an angular sensor 30 configured to detect the angular position of the cable guide 17 arm; sensors 31 and 32 configured to detect, respectively, the working depth of the cutter 9 and the size of the recirculation chamber of the cutter 9 (the distance between the cutter shaft and the crankcase); sensors 33 configured to detect the operating features of the engine 11; sensors 34 configured to detect the speed of the tracks 3; and a sensor 36 configured to detect the cable tension 16.

The sensors described above have the function of acquiring signals correlated to the operation data of the crawler vehicle 1 and, possibly, of the equipment, such as the shovel 8, the cutter 9, and the winch assembly 10.

The crawler vehicle 1 also comprises sensors (not shown in the figures) configured to acquire signals correlated to the weather conditions, such as outside temperature, humidity, and other physical quantities of the environment in which the crawler vehicle 1 operates.

The crawler vehicle 1 comprises sensors (not shown in the figures) configured to acquire signals correlated to the snow conditions, and the height of the snow.

The crawler vehicle 1 is equipped with sensors configured to acquire signals correlated to the morphology of the surrounding environment and to any obstacles of a non-morphological nature such as living animals or plants.

In this case, the crawler vehicle 1 comprises a sensor 37, a GPS receiver, for the geolocation and navigation of the crawler vehicle 1. The signals provided by the GPS are substantially correlated to the geolocation in relation to an absolute reference system. The information acquired through die GPS receiver enables the position of the crawler vehicle 1 to be defined in relation to reference points present on the maps and/or stored in a memory inside the control unit 13 and specific to the run or to the ski resort where the crawler vehicle 1 operates.

The crawler vehicle 1 comprises a sensor 38, such as an infrared camera, a LIDAR, a solid state LIDAR, a stereo camera configured to acquire signals correlated to the presence of living beings in the vicinity of the crawler vehicle 1; and sensors 39 and 40, such as a laser and a radar configured to acquire signals correlated to the presence of obstacles in the vicinity of the crawler vehicle 1.

The control unit 13 receives and processes the signals acquired from the sensors 26, . . . , 40 to provide a range of information in accordance with the display modes of the user interface 7.

The crawler vehicle 1 comprises projectors 41 configured to project contoured beams or images that define information on a surface outside the cab 6 and in the vicinity of the crawler vehicle 1.

With reference to the present disclosure, the term "information" is understood in a broad way to comprise an alphanumeric representation that humans can interpret or an infographic or simply the illumination of reference points and mobile or immobile obstacles in the vicinity of the crawler vehicle 1, which otherwise would not be seen or would not be relatively easily perceptible by persons in the vicinity of the crawler vehicle and by the driver of the crawler vehicle. With reference to the present disclosure, "projector" means a projector configured to project contoured beams, images, or alphanumeric representations such as Laser beamers, LED beamers, halogen beamers, laser beamers for shows, LED arrays, and Laser light arrays.

According to one embodiment of the present disclosure, the crawler vehicle 1 has a selector 42 that enables the driver to select which information to project outside the cab 6 according to their own preferences and the light and visibility conditions.

In use, the control unit 13 processes the signals acquired from the sensors 26, . . . , 40 to generate additional signals that are configured to control the projectors 41 so that they project information onto surfaces outside the cab 6.

For example, the signal provided by the angular sensor 28, which in this case is an absolute encoder configured to acquire the absolute number of turns of the sprocket wheel 15, is used for calculating an additional signal correlated to the residual length of the cable 16 (information) wound on the sprocket wheel 15 as a function of the geometry of the sprocket wheel 15 (number of layers of wound cable 16 and number of windings for each layer of wound cable). This information is represented by contoured beams on the ski run in graphic or alphanumeric form.

According to another example, the signal provided by the sensor 28 is used for calculating the winding speed on the sprocket wheel 15 (as a function of the time and of the winding layer) and is compared with the cable speed 16 at the pulley 20 as a function of the pulley 20 diameter and of the pulley 20 angular speed, which is calculated as a function of the signal provided by the angular sensor 29 and of time. If the two cable speeds 16 at two different points of the cable route 16 are different from each other and the difference exceeds a threshold range, then there has been a cable 16 winding problem on the sprocket wheel 15 and the control unit 13 issues an additional signal, in this case a specific error signal, to visually and/or acoustically warn the driver of the technical problem concerning the winch 10. The projectors 41 are configured to project the contoured beams or images representing error messages on the ski run as a function of the additional signals.

Generally, the aforementioned technical problem of the winch 10 occurs when the traction applied to the cable 16 is relatively too low and the cable 16 wound around the sprocket wheel 15 tends, because of its intrinsic rigidity, to independently unwind in a disorderly manner.

The signal generated by the sensor 28, in particular by the absolute encoder, is processed with the signal provided by the sensor 30, generally an angular sensor, to check whether the position of the arm of the cable guide 17 and the position of the winding on the sprocket wheel 15 comply with a predefined spatial relationship. If this spatial relationship is not complied with, the control unit 13 issues an error signal to visually (in accordance with the present disclosure) and acoustically warn the driver of the malfunction of the winch 10.

As a function of the speed difference of the tracks 3, the processing unit 13 provides a direction signal that the projector 41 projects as a graphic sign, for example an arrow (FIG. 2), onto the snowpack so that any human beings in the vicinity of the crawler vehicle 1 perceive the change in direction of the crawler vehicle 1 in advance.

The signals correlated to the speed of the tracks 3, which are provided by the sensors 34, are compared with the speed signals of the crawler vehicle 1 provided by the sensor 37, which in this case is a GPS satellite receiver, in the control unit 13 to process an additional signal correlated to the skidding of the crawler vehicle 1 to represent the information in graphic or alphanumeric form by light beams.

The signals generated by the sensor 37, GPS receiver, are processed in the control unit 13, to provide additional signals correlated to additional signals correlated to the position of the crawler vehicle 1 in relation to reference points such as, for example, the edges 43 of the ski run 44 (FIG. 2), and, possibly, in relation to the dividing line 45 that divides a machined portion of the ski run 44 from an unmachined portion (FIG. 2), and additional signals correlated to the speed and direction of travel of the crawler vehicle 1. The signals provided by the sensor 37, appropriately processed by the control unit 13, provide additional signals correlated to the height of the snow at the point where the crawler vehicle 1 is located. The reference points are illuminated by light beams generated by the projectors 41 to increase their visibility, while the information of the height of the snow is defined in a graphic and alphanumeric way by other contoured beams or images.

The projectors 41 of the crawler vehicle 1 are capable of illuminating the dividing line 45, including downstream of the crawler vehicle 1, so that the dividing line can be seen by other crawler vehicles (not shown in the figures) moving at a short distance behind the crawler vehicle 1 and so that the dividing line can define a reference point for the latter.

In addition, the signals provided by GPS enable the position of snow installations (not shown in the figures) arranged along the ski run and that, therefore, define obstacles for the crawler vehicle 1 to be determined. Based on these signals, the projector 41 illuminates the obstacle so that the driver can anticipate their manoeuvres to avoid the obstacle.

The signal provided by GPS can also be used to identify the anchorage point (not shown in the figures) of the cable 16 of the winch assembly 10. The anchorage point could be buried by snow and, for this reason, may not be relatively easily identifiable. The GPS signal, in combination with the ski resort maps stored in the GPS satellite receiver 37 or in the processing unit 13, provides signals on the position of the anchorage points, and the processing unit 13 provides an additional signal to control the projector 41 so that the projector directs a relatively cohesive beam of light on the point where the anchorage point is located.

The signals generated by the sensors 38, 39 and 40 are correlated to the position of any animate or inanimate obstacles and are processed, if necessary, by the control unit 13 to provide additional signals correlated to the position of said obstacles in relation to the crawler vehicle 1. The obstacles are also illuminated by light beams to increase their visibility.

Other signals acquired from the sensors 26, . . . , 40 are processed by the control unit 13 to generate additional control signals for the projectors 41: the traction signal of the cable 16, the working depth signal of the cutter 9, the signal correlated to the size of the working chamber (distance between the rotation axis and the crankcase) of the cutter 9. This information can be represented by contoured beams and/or images on the ski run 44 in graphic of alphanumeric form by the projectors 41. For this purpose, it is preferable, in certain instances, to have a projector 41 inside the cab 7 of the BenQ LU9715 BlueCore Laser Projector type or the Hyperion laser for animations with 10 channels DMX or LED array, configured to project onto the ski run 44.

The driver of the crawler vehicle 1 selects, depending on the weather conditions, in particular, the light and visibility conditions, which information is relatively best for projecting onto the ski run 44.

Figure 2:
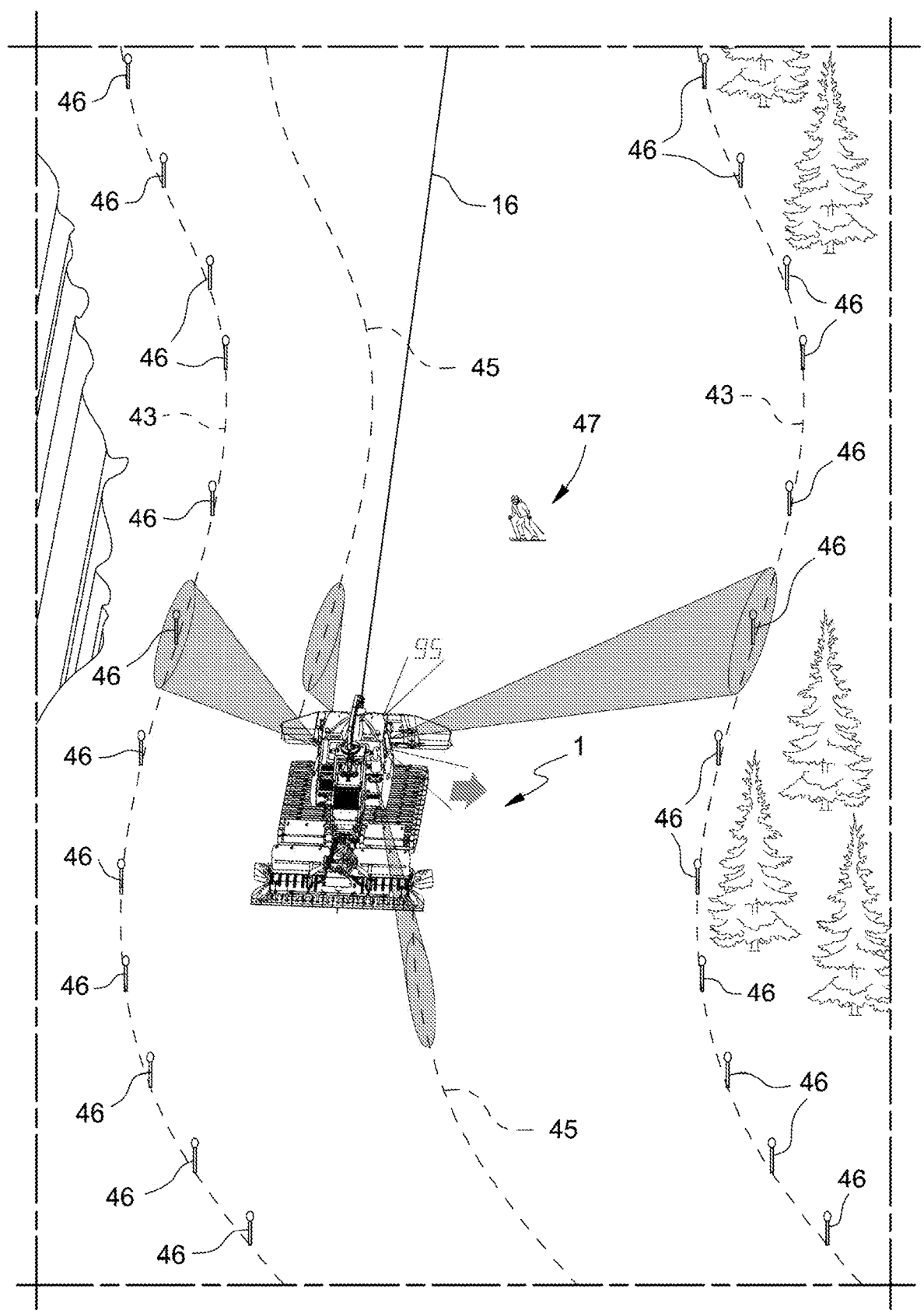
FIG. 2 is a perspective, top-down view of the crawler vehicle in FIG. 1 along a ski run, with parts removed for clarity and with a reduced scale.

With reference to FIG. 2, the crawler vehicle 1 runs on a ski run 44 delimited by the edges 43 and partly machined by the previous transit of another crawler vehicle (not shown in the figures). The edges 43 of the ski run 44 are virtual lines, such as colored, that pass through points defined by the respective poles 46 that are specially fixed to delimit the ski run 44.

The driver distinguishes the machined portion of the ski run from the unmachined portion of the ski run when visibility and light conditions are good. The control unit 13 can acquire navigation data from a previous crawler vehicle (not shown in the figures) to generate an additional signal correlated to the position of the dividing line 45 that divides the machined portion of the ski run 44 from the unmachined portion.

In the case shown in FIG. 2, on the ski run 44 there is a skier 47, who is identified by the infrared camera 38 and possibly illuminated by a projector 41.

If the winch assembly 10 is used, a projector 41 mounted on the arm 19 is activated to illuminate the cable 16.

In the case shown in FIG. 2, the driver selected the selector 42 to project some information outside the crawler vehicle 1: the projectors 41 project/illuminate the edges 43 of the ski run 44 in the vicinity of the crawler vehicle 1 and in the driver's field of view; the projectors 41 project/illuminate the dividing line 45 between the machined portion of the ski run 44 from the unmachined portion; the projector 41 projects the height of the snowpack onto the ski run 44; and the projector 41 illuminates the cable 16 with a cohesive beam so as to make the cable 16 more visible to the skier 47. The projection/illumination of the edges 43 and 45 defines precise reference points for the driver and keeps them away from cliffs that might be located in the vicinity of the ski run 44. The dividing line 45 is illuminated both upstream and downstream of the crawler vehicle 1.

The projectors 41 are selected from: Laser beamers; LED beamers; Laser/LED beamers; and halogen beamers with a high degree of image definition so as to precisely define the data projected onto the ski run 44 and to precisely define the edges 43 and the dividing line 45 of the ski un 44 itself.

The lighting of obstacles, including the cable 16, is intended to inform the driver of the crawler vehicle 1, and any other persons in the vicinity of the crawler vehicle 1, such as skiers or drivers of other crawler vehicles, of the presence of obstacles.

Furthermore, it is clear that the present disclosure also covers embodiments that are not described in the detailed description and equivalent embodiments, which fall within the scope of protection of the appended claims. As such, the scope of protection of the present disclosure is defined by the claims which cover variants not specifically described and equivalent embodiments. Accordingly, various changes and modifications to the presently disclosed embodiments will be apparent to those skilled in the art.

The invention claimed is:

1. A crawler vehicle comprising:
 a frame;
 a cab;
 two tracks;
 a user interface located in the cab;
 a sensor configured to acquire a signal from at least one of: a signal correlated to an operation of the crawler vehicle, a signal correlated to a weather condition, a signal correlated to a snow condition, a signal correlated to a position of the crawler vehicle in relation to a reference point that defines an edge of a ski run, and a signal correlated to a position of the crawler vehicle in relation to an obstacle, wherein the sensor comprises a GPS receiver configured to acquire at least one of: a signal correlated to a geolocation of the crawler vehicle and a signal correlated to a navigation of the crawler vehicle;
 a control unit configured to:
  process the acquired signal and determine an additional signal, and determine, based on the at least one of the signal correlated to the geolocation of the crawler vehicle and the signal correlated to the navigation of the crawler vehicle, a further signal correlated to the position of the crawler vehicle in relation to the reference point; and
 a projector configured to:
  project, onto a surface outside the cab, at least one of: a contoured beam based on the determined additional signal, and an image based on the determined additional signal, and
  project a contoured beam that illuminates the reference point defining the edge of the ski run comprising a dividing line between a machined portion of the ski run and an unmachined portion of the ski run, wherein different dividing lines are illuminated by the contoured beam at different points in time based on different further signals correlated to different positions of the crawler vehicle in relation to the reference point.

2. The crawler vehicle of claim 1, wherein the user interface comprises a selector operable to select information to be projected outside the cab from information correlated to at least one of: the operation of the crawler vehicle, the weather condition, the snow condition, the position of the crawler vehicle in relation to the reference point, and the position of the crawler vehicle in relation to the obstacle.

3. The crawler vehicle of claim 1, wherein the projector is selected from the group consisting of: a Laser beamer, an LED beamer, a Laser/LED beamer, and a halogen beamer.

4. The crawler vehicle of claim 1, wherein responsive to the acquired signal being correlated to the snow condition, the projector is configured to project, onto a surface of a ski run and in at least one of a graphic form and an alphanumeric form, at least one of a contoured beam that defines information on the snow condition and an image that defines information on the snow condition.

5. The crawler vehicle of claim 1, wherein responsive to the acquired signal being correlated to at least one of: the position of the crawler vehicle in relation to the reference point and the position of the crawler vehicle in relation to the obstacle, the projector is configured to project at least one of: a light beam that illuminates the reference point and a light beam that illuminates the obstacle.

6. The crawler vehicle of claim 1, wherein responsive to the acquired signal being correlated to the operation of the crawler vehicle, the projector is configured to project, onto a surface of a ski run and in at least one of a graphic form and an alphanumeric form, at least one of: a contoured beam that defines information on operational data of the crawler vehicle, and an image that defines information on operational data of the crawler vehicle.

7. A method of displaying crawler vehicle information, the method comprising:
acquiring a signal from at least one of: a signal correlated to an operation of a crawler vehicle, a signal correlated to a weather condition, a signal correlated to a snow condition, a signal correlated to a position of the crawler vehicle in relation to a reference point that defines an edge of a ski run, and a signal correlated to a position of the crawler vehicle in relation to an obstacle;
acquiring at least one of: a signal correlated to a geolocation of the crawler vehicle and a signal correlated to a navigation of the crawler vehicle;
processing the acquired signal to determine an additional signal;
determining, based on the at least one of the signal correlated to the geolocation of the crawler vehicle and the signal correlated to the navigation of the crawler vehicle, a further signal correlated to the position of the crawler vehicle in relation to the reference point;
projecting, via a projector fitted on the crawler vehicle and onto a surface outside a cab of the crawler vehicle, at least one of: a contoured beam based on the determined additional signal, and an image based on the determined additional signal, and
projecting, via the projector, a light beam to illuminate the reference point defining the edge of the ski run comprising a dividing line between a machined portion of the ski run and an unmachined portion of the ski run, wherein different dividing lines are illuminated by the contoured beam at different points in time based on different further signals correlated to different positions of the crawler vehicle in relation to the reference point.

8. The method of claim 7, further comprising selecting information to be projected onto the surface outside the cab from information correlated to at least one of: the operation of the crawler vehicle, the weather condition, the snow condition, the position of the crawler vehicle in relation to the reference point, and the position of the crawler vehicle in relation to the obstacle.

9. The method of claim 7, wherein the projector is selected from the group consisting of: a Laser beamer, an LED beamer, a Laser/LED beamer, and a halogen beamer.

10. The method of claim 7, further comprising:
acquiring at least one of: a signal correlated to a geolocation of the crawler vehicle and a signal correlated to a navigation of the crawler vehicle;
determining, based on the at least one of the signal correlated to the geolocation of the crawler vehicle and signal correlated to the navigation of the crawler vehicle, a further signal correlated to a position of the obstacle; and
projecting, via the projector, a light beam to illuminate the obstacle.

11. The method of claim 7, further comprising, responsive to the acquired signal being correlated to the operation of the crawler vehicle, projecting, via the projector and onto a surface of a ski run, at least one of a contoured beam that defines information on operational data of the crawler vehicle and an image that defines information on operational data of the crawler vehicle, wherein the projection is in at least one of a graphic form and an alphanumeric form.

12. A crawler vehicle comprising:
a frame;
a cab;
two tracks;
a user interface located in the cab;
a GPS receiver configured to acquire a signal correlated to a geolocation of the crawler vehicle and a signal correlated to a navigation of the crawler vehicle;
a control unit configured to:
process the acquired signal and determine an additional signal, and
determine, based on the signal correlated to the geolocation of the crawler vehicle and the signal correlated to the navigation of the crawler vehicle, a further signal correlated to a position of a dividing line that divides a machined portion of a ski run from an unmachined portion of the ski run; and
a projector configured to
project a contoured beam that illuminates the dividing line between the machined portion of the ski run and the unmachined portion of the ski run, wherein different dividing lines are illuminated by the contoured beam at different points in time based on different further signals correlated to different geolocations of the crawler vehicle and different navigations of the crawler vehicle.

13. The crawler vehicle of claim 12, wherein the user interface comprises a selector operable to select information to be projected outside the cab from information correlated to at least one of: an operation of the crawler vehicle, a weather condition, a snow condition, a position of the crawler vehicle in relation to a reference point, and a position of the crawler vehicle in relation to an obstacle.

14. The crawler vehicle of claim 12, wherein the projector is selected from the group consisting of: a Laser beamer, an LED beamer, a Laser/LED beamer, and a halogen beamer.

15. The crawler vehicle of claim 12, wherein responsive to the acquired signal being correlated to a snow condition, the projector is configured to project, onto a surface of a ski run and in at least one of a graphic form and an alphanumeric form, at least one of a contoured beam that defines information on the snow condition and an image that defines information on the snow condition.

16. The crawler vehicle of claim 12, wherein responsive to the acquired signal being correlated to at least one of: a position of the crawler vehicle in relation to a reference point and a position of the crawler vehicle in relation to an obstacle, the projector is configured to project at least one of: a light beam that illuminates the reference point and a light beam that illuminates the obstacle.

17. The crawler vehicle of claim 12, wherein responsive to the acquired signal being correlated to an operation of the crawler vehicle, the projector is configured to project, onto a surface of a ski run and in at least one of a graphic form and an alphanumeric form, at least one of: a contoured beam that defines information on operational data of the crawler vehicle, and an image that defines information on operational data of the crawler vehicle.

18. A method of displaying crawler vehicle information, the method comprising:
  acquiring a signal correlated to a geolocation of the crawler vehicle and a signal correlated to a navigation of the crawler vehicle;
  processing the acquired signal to determine an additional signal;
  determining, based on the signal correlated to the geolocation of the crawler vehicle and the signal correlated to the navigation of the crawler vehicle, a further signal correlated to a position of a dividing line that divides a machined portion of a ski run from an unmachined portion of the ski run; and
  projecting, via a projector, a light beam to illuminate the dividing line between the machined portion of the ski run and the unmachined portion of the ski run, wherein different dividing lines are illuminated by the contoured beam at different points in time based on different further signals correlated to different geolocations of the crawler vehicle and different navigations of the crawler vehicle.

19. The method of claim 18, further comprising selecting information to be projected onto the surface outside the cab from information correlated to at least one of: an operation of the crawler vehicle, a weather condition, a snow condition, a position of the crawler vehicle in relation to a reference point, and a position of the crawler vehicle in relation to an obstacle.

20. The method of claim 18, wherein the projector is selected from the group consisting of: a Laser beamer, an LED beamer, a Laser/LED beamer, and a halogen beamer.

21. The method of claim 18, further comprising:
  determining, based on the signal correlated to the geolocation of the crawler vehicle and signal correlated to the navigation of the crawler vehicle, a further signal correlated to a position of an obstacle; and
  projecting, via the projector, a light beam to illuminate the obstacle.

22. The method of claim 18, further comprising, responsive to the acquired signal being correlated to an operation of the crawler vehicle, projecting, via the projector and onto a surface of a ski run, at least one of a contoured beam that defines information on operational data of the crawler vehicle and an image that defines information on operational data of the crawler vehicle, wherein the projection is in at least one of a graphic form and an alphanumeric form.

* * * * *